US006515995B1

(12) United States Patent
Kim

(10) Patent No.: US 6,515,995 B1
(45) Date of Patent: Feb. 4, 2003

(54) ASYMMETRIC DIGITAL SUBSCRIBER LINE INTERFACING SYSTEM IN AN ATM EXCHANGE SYSTEM

(75) Inventor: Hong Seong Kim, Kyunggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/197,659

(22) Filed: Nov. 23, 1998

(30) Foreign Application Priority Data

Dec. 30, 1997 (KR) .............................. 97-79480

(51) Int. Cl.[7] .............................................. H04L 12/28
(52) U.S. Cl. ..................... 370/395.6; 370/249; 370/466; 370/474; 370/463
(58) Field of Search .......................... 370/395.1, 395.5, 370/395.61, 395.62, 395.63, 395.64, 419, 465, 466, 474, 482, 248, 249, 251, 467, 469, 420, 463, 486

(56) References Cited

U.S. PATENT DOCUMENTS

| | | | | |
|---|---|---|---|---|
| 5,756,280 A | | 5/1998 | Soora et al. ................. 455/4.2 |
| 5,784,558 A | * | 7/1998 | Emerson et al. ............. 709/230 |
| 5,812,786 A | * | 9/1998 | Seaholtz et al. ........ 395/200.63 |
| 6,081,533 A | * | 6/2000 | Laubach et al. ............. 370/421 |
| 6,256,308 B1 | * | 7/2001 | Carlsson ..................... 370/395 |
| 6,314,102 B1 | * | 11/2001 | Czerwiec et al. ......... 370/395.6 |
| 2001/0043568 A1 | * | 11/2001 | Mchale et al. .............. 370/254 |

* cited by examiner

Primary Examiner—Dang Ton
Assistant Examiner—Tri H. Phan
(74) Attorney, Agent, or Firm—Fleshner & Kim, LLP

(57) ABSTRACT

A communications management system service as an interface between an ADSL (Asynchronous Digital Subscriber Line) terminal and an ATM exchanger. The system includes a control section, an upstream cell processing section, and a down stream cell processing section. The control section receives user cell signals from a subscriber terminal and converts the user cell signals to ATM cells. The upstream cell processing section then converts the ATM cells into signals for transmission to a subscriber control system. The downstream cell processing section converts signals received from the subscriber control system to ADSL signals to be sent to the subscriber terminal. The ADSL signals may be E1 signals. To check for errors in the system, the controller sends a test cell through the system. When the test cell loops back to the controller, it is compared to the test cell as it was initially generated. A decision concerning system errors is then made based on this comparison.

20 Claims, 4 Drawing Sheets

ASYMMETRIC DIGITAL SUBSCRIBER LINE INTERFACING SYSTEM IN AN ATM EXCHANGE SYSTEM

BACKGROUND OF THE INVENTION

1. Field of the Invention

The present invention relates to an ATM exchange system and, more particularly, to an ADSL (Asymmetric Digital Subscriber Line) interfacing system in the ATM exchanger which is designed to interface ADSL subscribers with the ATM exchanger.

2. Description of the Related Art

High-speed transmission media are usually needed in order to be served with Internet or VOD (Video on Demand) service of high quality. This is the principal reason for appearance of ISDN (Integrated Services Digital Network) as a high-speed transmission medium.

The ISDN is an integrated services network that combines voice and non-voice services in the electrical communication network using the digital system, digitalizing non-voice information such as images and data as well as voice information to be connect with highly developed communication equipment or computers via subscribers lines. The ISDN has enabled efficient data transmission, storage and processing.

The effective service speed for exchanged or fixed connection ranges from 64 Kbps to 128 Kbps. The maximum rate of 128 Kbps can be served by use of optical cables to realize high-speed service and satisfy the request of subscribers.

However, there has remained a problem in that all cables between the telephone station and subscribers must be replaced with optical cables that are too expensive, in order to realize the high-speed services.

SUMMARY OF THE INVENTION

Accordingly, an object of the present invention is to provide high speed VOD or internet services for general subscribers with telephone lines by interfacing the subscribers connected to the ADSL interfacing system with an ATM exchanger.

To achieve these and other advantages, and in accordance with the purpose of the present invention as embodied and broadly described, an ADSL interfacing system of ATM exchanger includes: a CPU and peripheral circuit section for receiving signals from a subscriber terminal and identifying a specified value to be synchronized; an upstream cell processing section for converting the signals received from the subscriber terminal to an ATM cell to be transmitted to a subscriber control system; and a downstream cell processing section for converting the signals received from the subscriber control system to transmission signals to be sent to the subscriber terminal. The CPU and peripheral circuit section receives the signals from the subscriber terminal in the unit of bytes, and the downstream cell processing section converts the signals received from the subscriber control system to an E1 signal to be sent to the subscriber terminal.

Alternatively, in the ADSL interfacing system of ATM exchanger according to the preferred embodiment of the present invention, a cell testing buffer section is further included to output test cells received via the respective components of the upstream cell processing section to the downstream cell processing section, and local loop-back test cells received via the respective components of the downstream cell processing section to the CPU and peripheral circuit section.

Furthermore, the CPU and peripheral circuit section generates the test cells, applies them to the upstream cell processing section, reads out the local loop-back test cells via the cell testing buffer section, and compares the test cells and the local loop-back test cells in order to check the presence of errors.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

The present invention is divided into three parts including a CPU and peripheral circuit section, an upstream cell processing section and a downstream cell processing section (expediently, not shown). The present invention having the related components interfaces ADSL subscribers with an ATM exchanger by use of an ADSL interfacing system, which can transmit a data from the telephone station to the subscribers at a rate of 2 to 8 Mbps and from the subscribers to the telephone station at a rate of 64 to 640 Kbps, so that it is possible to transmit a data by way of high-speed wide channel exchange connection using the existing telephone lines and communicate voice signals bi-directionally.

Figure 1:
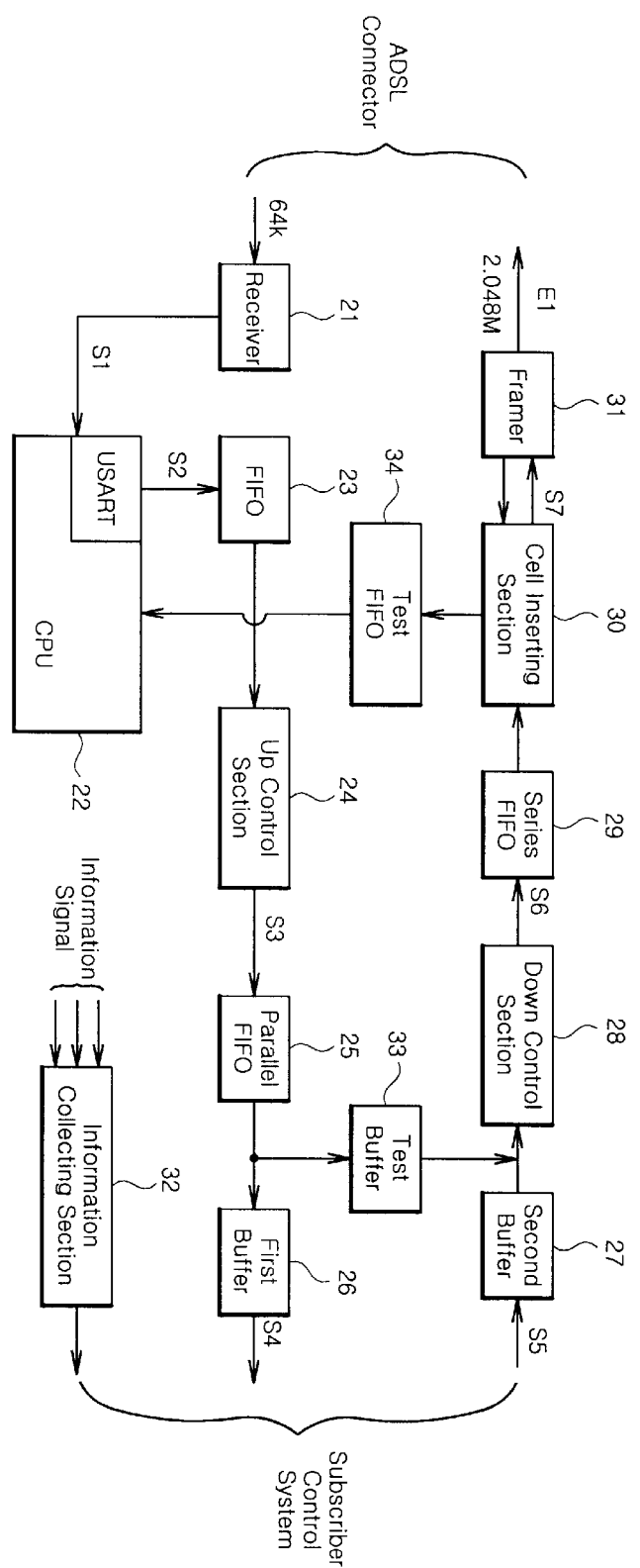
FIG. 1 is a block diagram showing the construction of an ADSL interfacing system of ATM exchanger according to a preferred embodiment of the present invention.

An ADSL interfacing system of ATM exchanger according to the present invention comprises, as shown in FIG. 1, a receiver 21, a CPU 22, an FIFO 23, an up control section 24, a parallel FIFO 25, a first buffer 26, a second buffer 27, a down control section 28, a series FIFO 29, a cell insertion section 30, a framer 31, an information collecting section 32, a test buffer 33, and a test FIFO 34.

The receiver 21 converts 64 Kbps USART (Universal Synchronous/Asynchronous Receiver/Transmitter) signals received to subscriber terminals to TTL level signals, which are then applied to the CPU 22. The CPU 22 receives the TTL level signals from the receiver 21 in the unit of bytes using the USART part, identifies a specified value among the received data to be brought in synchronization, and groups the received data by 53 bytes to be stored in the FIFO 23. Also, The CPU 22 generates test cells to be stored in the FIFO 23, reads out local loop back test cells stored in the test FIFO 34, and compares it with the generated test cells to check the presence of errors. The FIFO 23 stores the received data or test cells applied from the CPU 22. The up control section 24 reads out 53-byte received data or test cells stored in the FIFO 23 and parallels the 8-bit units of data or test cells into 16-bit units to be stored in the parallel FIFO 25. The parallel FIFO 25 stores the parallel received data or test cells applied from the up control section 24. The first buffer 26 stores the data from the parallel FIFO 25 in the unit of one ATM cell and outputs it by the request of the subscriber control system. The second buffer 27 stores the data from the subscriber control system and outputs it by the request of the down control section 28. The down control section 28 reads out the 16-bit parallel data from the second buffer 27 or the 16-bit parallel test cells from the test buffer 33 to be converted to 8-bit series units of data or test cells. The series FIFO 29 stores the series data or test cells from the down control section 28. The cell inserting section 30 inserts 53-byte series data read out from the series FIFO 29 into an E1 frame and applies it to the framer 31 as well as 53-byte series cells read out from the series FIFO 29. The cell inserting section 30 receives the local loop back test cells from the framer 31 and stores it in the test FIFO 34.

The framer 31 converts the 53-byte series data to a 2.048 MHz E1 signal via the cell inserting section 30, transmitting it to the subscriber terminal, or local loop-back the 53-byte series test cells received from the cell inserting section 30 to be applied back to the cell inserting section 30. The information collecting section 32 collects information signals concerning CPU malfunction, clock error, board dislocation or the like to be transmitted to the subscriber control system. The test buffer 33 stores the test cells from the parallel FIFO 25 and outputs it by the request of the down control section 28. The test FIFO 34 stores the local loop-back test cells from the cell inserting section 30 to be output by the request of the CPU 22.

The ADSL interfacing system of ATM exchanger according to the preferred embodiment of the present invention operates as follows.

Figure 2:
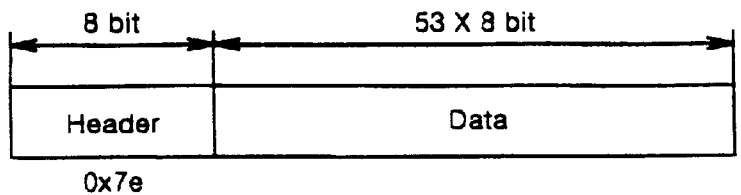
FIG. 2 illustrates the form of a TTL level signal in FIG. 1.

First, a clock supply system generates clock signals to be used in the CPU 22 and applies 64 Kbps USART signals from the subscriber terminal to the receiver 21, e.g., RS232C receiver via an ADSL connector. The receiver 21 converts the signals from the related subscriber terminal to TTL level signals S1 as shown in FIG. 2, applying the TTL level signals to the CPU 22, for example, MC68360 chip.

Figure 3:
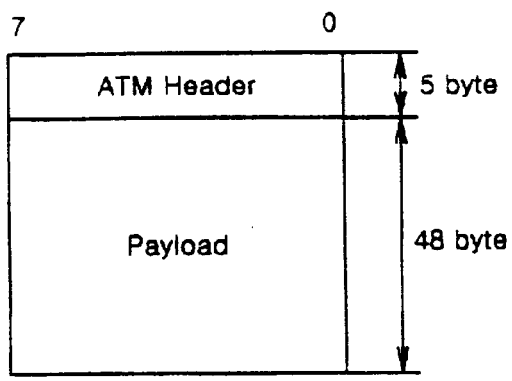
FIG. 3 illustrates the form of a 53-byte ATM data in FIG. 1.

The CPU 22 receives the TTL level signals from the receiver 21 in the unit of bytes using the USART part and groups the received data by 53 bytes to be stored in the FIFO 23 as 53-byte ATM data S2 as shown in FIG. 3.

In cooperation with the subscriber terminal, the CPU 22 applies the 53-byte ATM data S2 as well as a predetermined value, e.g., 7Eh (Echo) in order to detect the start of the ATM cell received by the CPU 22 via the receiver 21, synchronizing it as if the start of the ATM cell falls on the point of time the predetermined value is applied.

Figure 4:
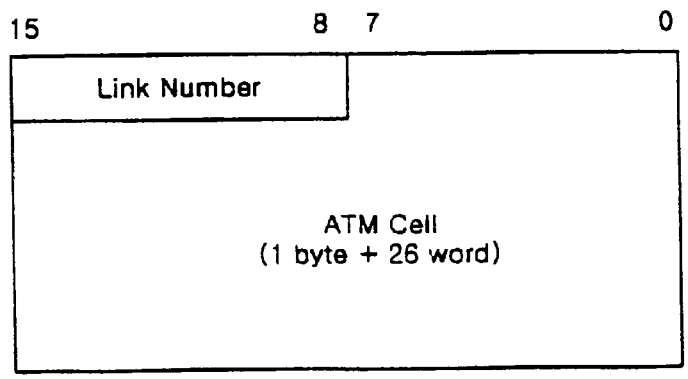
FIG. 4 illustrates the form of a parallel data in FIG. 1.

The CPU 22, however, searches for the start synchronization of the ATM cells several times before it recognizes the start of the ATM cells immediately upon the receipt of the predetermined value once, because the predetermined value may lie among the ATM cells. Accordingly, the FIFO 23 stores 53-byte ATM data S2 applied from the CPU 22. The up control section 24 reads out the 53-byte ATM data from the FIFO 23 to parallel the 8-bit units into 16-bit units, storing parallel data as shown in FIG. 4 in the parallel FIFO 25.

The reason that the up control section 24 parallels the 8-bit data into 16-bit units is to lower the transfer rate in order to avoid errors in the data during communications with the subscriber control system. The subscriber control system receives data from the first buffer 26 and alarm information from the information collecting section 32 to be transmitted to the other components in the ATM exchanger.

The parallel FIFO 25 stores the paralleled data S3 applied from the up control section 24. When the stored data accumulate as much as one ATM cell, the parallel FIFO 25 applies them to the first buffer 26, which stores the data applied from the parallel FIFO 25 in the unit of one ATM cell to be output by the request of the subscriber control system also in the unit of one ATM cell.

Figure 5:
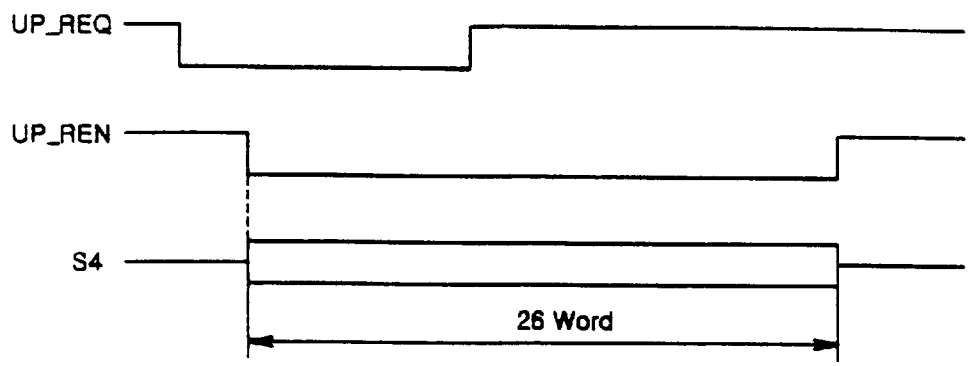
FIG. 5 is a timing diagram illustrating data transmission to a subscriber control system in FIG. 1.

In the procedure of communication with the subscriber control system, as shown in the timing diagram of FIG. 5, the CPU 22 sends an UP_REQ (Up Request Signal) as 26-word ATM cells S4 to be sent accumulate in the first buffer 26 and sends the transmission ATM cells S4 during the period of 24 words and receiving an UP REN (Up Response Signal) indicating that it is ready to received data.

Figure 6:
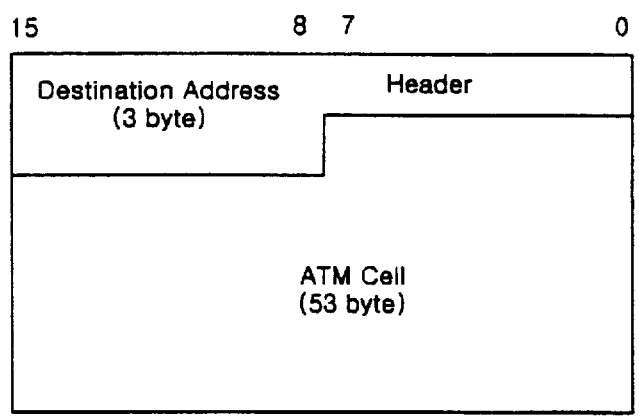
FIG. 6 illustrates the form of a received data in FIG. 1.

On the contrary, in case where the subscriber control system transmits a data to the subscriber terminal via the ADSL connector, the second buffer 27 stores a received data S5 shown in FIG. 6 from the subscriber control system and outputs it by the request of the down control section 28.

Figure 7:
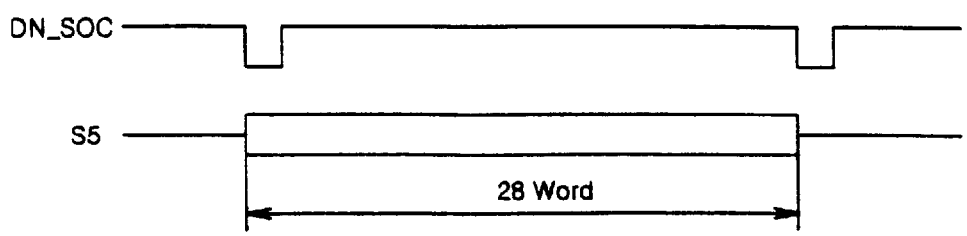
FIG. 7 is a timing diagram illustrating data reception from the subscriber control system in FIG. 1.

In the procedure of communication with the subscriber control system, as shown in the timing diagram of FIG. 7, the received data S5 is input to the second buffer 27 in synchronization with a DN_SOC (Down Start of Cell) signal periodically received from the subscriber control system. 3-byte header is added to the 53-byte data corresponding to the ATM cell among the 28-word received data S5, the header including a destination address to be sent. Thus down control section 28 analyzes the destination address to check upon whether or not the destination address is the ATM cell of itself and, if not the ATM cell, abandons the destination address, which means "demultiplexing function".

The down control section 28 reads out the 16-bit data from the second buffer 27 to be converted to 8-bit series units of data. The series data S6 as shown in FIG. 3 is stored in the series FIFO 29.

The series FIFO 29 stores the series data applied from the down control section 28. Alternatively, if the stored data accumulate as much as one ATM cell, the series FIFO 29 outputs the data to the framer 31, e.g., PM6341, and to the cell inserting section 30, e.g., commercial chip of PM7345.

Accordingly, the cell inserting section 30 inserts the 53-byte ATM cell read out from the series FIFO 29 into the related E1 frame. The inserted ATM cell S7 is applied to the framer 31, which converts the ATM cell S7 including the related E1 frame to a 2.048 MHz E1 signal. The E1 signal is sent to the ADSL connector.

Figure 8:
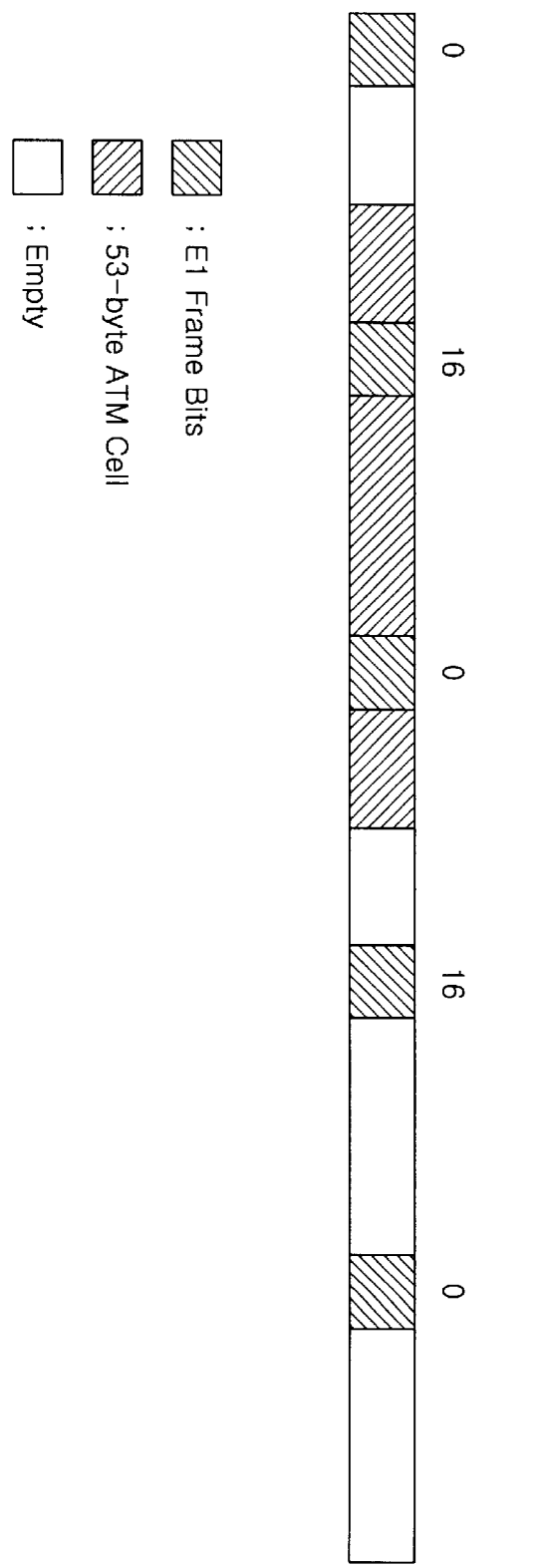
FIG. 8 illustrates the form of an ATM cell inserted into an E1 frame in FIG. 1.

In FIG. 8, the left-hatched area is an area to insert E1 frame bits and the right-hatched area is an area to insert the 53-byte ATM cell. A dummy data is inserted via the cell inserting section 30 and frame alignments bits are inserted via the framer 31.

On the other hand, the information collecting section 32 collects information signals concerning CPU malfunction, clock error, board dislocation or the like possibly occurring in the system and transmits the information signals to the subscriber control system.

A self-test for function may be performed with test buffer 33 and test FIFO 34. The CPU 22 generates test cells to be stored in the test buffer 33 via FIFO 23, up control section 24 and parallel FIFO 25 in the above-mentioned operation. The test buffer 33 stores the test cells generated at the CPU 22 and outputs it by the request of the down control section 28. The down control section 28 transfers the test cells read out from the test buffer 33 to the framer 31 via series FIFO 29 and cell inserting section 30 in the operation as described above. The framer 31 uses its internal function to local loop back the test cells applied from the down control section 28, applying the test cells to the cell inserting section 30. The cell inserting section 30 stores the local loop-back test cells in the test FIFO 34.

Then the test FIFO 34 stores the local loop-back test cells applied from the cell inserting section 30. These local loop-back test cells are read out from the test FIFO 34 by the CPU 22 and compared with the initially transmitted test cells in order to check errors in the test cells.

Such as in the present invention as described above, the signals applied from the subscriber terminal are transferred to the subscriber control system via the up control section, while the signals applied from the subscriber control system are transmitted to the subscriber terminal via the cell inserting section under the control of the down control section. Furthermore, the CPU generates test cells to check the presence of errors in the test cells, which makes it possible to interface the ATM exchanger with the ADSL subscribers and enables the general subscribers to be served with high-speed VOD or internet services by means of telephone lines.

It will be apparent to those skilled in the art that various modifications and variations can be made in the present invention without deviating from the spirit or scope of the invention. Thus, it is intended that the present invention covers the modifications and variations of this invention provided they come within the scope of the appended claims and their equivalents.

What is claimed is:

1. An ADSL interfacing system of an ATM exchanger, comprising:
   a control section which receives user cell signals from a subscriber terminal, converts the user cell signals to ATM cells, and outputs the ATM cells;
   an upstream cell processing section which converts the ATM cells output from the controlling section from n-bit serial ATM data to k-bit parallel ATM data to be transmitted to a subscriber control system, where k>n; and
   a downstream cell processing section which converts signals received from the subscriber control system from k-bit parallel ATM data to n-bit serial ATM data in order to generate transmission signals to be sent to the subscriber terminal.

2. The ADSL interfacing system as claimed in claim 1, wherein the control section receives the user cell signals from the subscriber terminal in a unit of bytes.

3. The ADSL interfacing system as claimed in claim 1, wherein the downstream cell processing section converts the signals received from the subscriber control system to an E1 signal to be sent to the subscriber terminal.

4. The ADSL interfacing system as claimed in claim 1, wherein the control section generates the test cells, applies them to the upstream cell processing section, reads out the local loop-back test cells via the cell testing buffer section, and compares the test cells and the local loop-back test cells in order to check presence of errors.

5. The ADSL interfacing system as claimed in claim 1, further comprising an information collecting section for collecting alarm signals to be transmitted to the subscriber control signal.

6. An ADSL interfacing system of an ATM exchanger, comprising:
   a controller which receives user cell signals from a subscriber terminal, converts the user cell signals to ATM cells, and outputs the ATM cells;
   an upstream cell processor which converts the ATM cells output from the controller to signals to be transmitted to a subscriber control system; and
   a downstream cell processor which converts signals received from the subscriber control system to transmission signals to be sent to the subscriber terminal,
   wherein the upstream cell processor comprises:
      a receiver which converts the user cell signals received from the subscriber terminal to TTL level signals to be applied to the controller;
      a FIFO which stores the ATM cells output from the controller;
      an up control section which reads out the ATM cells stored in the FIFO and converts them to parallel data;
      a parallel FIFO which stores the parallel data output from the up control section; and
      a first buffer which accumulates the parallel data output from the parallel FIFO and outputs the signals to be transmitted to the subscriber control system based on said accumulated data.

7. The ADSL interfacing system as claimed in claim 6, wherein the TTL level signal generated at the receiver comprises an 8-bit header and a 424-bit data.

8. The ADSL interfacing system as claimed in claim 6, wherein the parallel data stored in the parallel FIFO comprises an 8-bit link number and a 26-word-plus-1-byte ATM cell.

9. The ADSL interfacing system as claimed in claim 6, wherein the each of the ATM cells stored in the FIFO comprises a 5-byte ATM header and a 48-byte payload.

10. The ADSL interfacing system as claimed in claim 6, wherein the controller sends an up request signal to the subscriber control system when the parallel data accumulate in the first buffer, and then sends the signals to be transmitted to the subscriber control system as 26 word cells upon receipt of an up response signal from the subscriber control system.

11. An ADSL interfacing system of an ATM exchanger, comprising:
   a control section which receives user cell signals from a subscriber terminal, converts the user cell signals to ATM cells, and outputs the ATM cells;
   an upstream cell processing section which converts the ATM cells output from the controlling section to signals to be transmitted to a subscriber control system; and
   a downstream cell processing section which converts signals received from the subscriber control system to transmission signals to be sent to the subscriber terminal,
   wherein the downstream cell processing section comprises:
      a second buffer which stores the signals received from the subscriber control system;
      a down control section which reads out data derived from the signals stored in the second buffer and converts them to series data;
      a series FIFO which stores the series data output from the down control section;
      a cell inserting section which reads out the series data from the series FIFO and inserts the series data into an E1 frame; and a framer which converts the series data inserted into the E1 frame into E1 signals and sends the E1 signals to the subscriber terminal.

12. The ADSL interfacing system as claimed in claim 11, wherein the signals from the subscriber control system are received in synchronization with down start signals periodically received from the subscriber control system.

13. The ADSL interfacing system as claimed in claim 11, wherein each of the signals stored in the second buffer comprises an 8-bit header, a 3-byte destination address and a 53-byte cell.

14. The ADSL interfacing system as claimed in claim 11, wherein each of the E1 signals sent to the subscriber terminal includes an area to insert E1 frame bits and an area to insert the series data and at least one of dummy data inserted by the cell inserting section and frame alignment bits inserted by the framer.

15. An ADSL interfacing system of an ATM exchanger, comprising:
- a control section which receives user cell signals from a subscriber terminal, converts the user cell signals to ATM cells, and outputs the ATM cells, said control section also generating a test cell;
- an upstream cell processing section which converts the ATM cells output from the controlling section to signals to be transmitted to a subscriber control system, wherein the test cell generated by the control section passes through the upstream call processing section;
- a downstream cell processing section which converts signals received from the subscriber control system to an E1 signal to be sent to the subscriber terminal, and which outputs a local loop-back test cell;
- a cell testing buffer section which passes the test cell from the upstream cell processing section to the downstream cell processing section as the local loop-back test cell section, wherein the control section compares the test cell as initially generated with the local loop-back test cell to check for errors; and
- an information collecting section which collects alarm signals to be transmitted to the subscriber control system.

16. An ADSL interfacing system of an ATM exchanger, comprising:
- a receiver which converts user cell signals received from a subscriber terminal to TTL level signals;
- a controller which receives the TTL level signals from the receiver in a unit of bytes and converts the TTL signals into ATM cells, said controller further generating a test cell;
- a FIFO which stores the ATM cells from the controller;
- an up control section which reads out the ATM cells stored in the FIFO and converts them to parallel data, and which converts the test cell generated by the controller into parallel test cells;
- a parallel FIFO which stores the parallel data and parallel test cells output from the up control section; and
- a first buffer which accumulates the parallel data output from the parallel FIFO and outputs the signals to be transmitted to the subscriber control system based on said accumulated data;
- a test buffer which stores the parallel test cells output from the parallel FIFO;
- a second buffer which stores signals received from the subscriber control system;
- a down control section which reads out data derived from the signals stored in the second buffer and the parallel test cells stored in the buffer section, and converts the read-out data and the parallel test cells into series data and series test cells, respectively;
- a series FIFO which stores the series data and the series test cells output from the down control section;
- a cell inserting section which reads out the series data from the series FIFO and inserts the series data into an E1 frame, and which receives the series test cells as local loop-back cells;
- a framer which converts the series data inserted into the E1 frame into E1 signals and sends the E1 signals to the subscriber terminal, wherein the local loop-back test cells pass through the framer;
- a test FIFO which stores the local loop-back test cells which passed through the framer from the cell inserting section and outputs the local loop-back test cells to the controller, wherein the control section compares the test cell as initially generated with the local loop-back test cell to check for errors; and
- an information collecting section which collects alarm signals to be sent to the subscriber control system.

17. The ADSL interfacing system as claimed in claim 1, wherein said n-bit serial ATM data is 8-bit data and said k-bit parallel ATM data is 16-bit data.

18. The ADSL interfacing system as claimed in claim 1, wherein the user cell signals are USART signals.

19. The ADSL interfacing system as claimed in claim 1, wherein the control section detects a start of the user cell signals based on start synchronization information received from the subscriber terminal.

20. An ADSL interfacing system of an ATM exchanger, comprising:
- a control section which receives user cell signals from a subscriber terminal and converts the user cell signals to ATM cells, said control section further generating a test cell;
- an upstream cell processing section which converts the ATM cells output from the controlling section to signals to be transmitted to a subscriber control system, said test cell passing through said upstream cell processing section; and
- a downstream cell processing section which converts signals received from the subscriber control system to transmission signals to be sent to the subscriber terminal, said downstream cell processing section receiving said test cell from said upstream cell processing section and transmitting said test cell as a loop-back test cell to the control section, said control section comparing the loop-back test cell with said test cell as initially generated to determine errors in said system.

* * * * *